(12) United States Patent
Kuo et al.

(10) Patent No.: US 6,637,209 B2
(45) Date of Patent: Oct. 28, 2003

(54) ENGINE CORE ROTOR SHAFT STRUCTURE FOR GAS TURBINE ENGINE

(75) Inventors: Chii-Rong Kuo, Taoyuan Hsien (TW); Ta-Wei Wang, Panchiao (TW); Jia-Ruey Wu, Hsinchu Hsien (TW); Ling-Chia Weng, Chiayi Hsien (TW); Tao-Pang Hsiung, Pingtung (TW); Chia-Yang Chang, Tu-Cheng (TW)

(73) Assignee: Industrial Technology Research Institute, Hsinchu (TW)

( * ) Notice: Subject to any disclaimer, the term of this patent is extended or adjusted under 35 U.S.C. 154(b) by 1 day.

(21) Appl. No.: 10/026,447

(22) Filed: Dec. 27, 2001

(65) Prior Publication Data

US 2003/0121270 A1 Jul. 3, 2003

(51) Int. Cl.$^7$ ................................................. F02C 3/16
(52) U.S. Cl. .............................. 60/804; 60/805; 415/91
(58) Field of Search .......................... 60/268, 804, 805; 415/91

(56) References Cited

U.S. PATENT DOCUMENTS 2,702,985 A * 3/1955 Howell .......................... 60/268
4,707,978 A * 11/1987 Garcia Cascajosa ......... 415/91

* cited by examiner

*Primary Examiner*—Michael Koczo
(74) *Attorney, Agent, or Firm*—Bacon & Thomas, PLLC

(57) ABSTRACT

An engine core structure for a gas turbine engine includes an outer annular shaft body, a turbine rotor body, turbine rotor blades radially connected between the outer annular shaft body and the turbine rotor body to hold the turbine rotor body in the rear section of the outer annular shaft body, the outer annular shaft body including slots through which compressed air passes in a radially inward direction, and a can type combustor mounted in a receiving clamber inside the outer annular shaft body to enlarge the diameter of the core shaft, to avoid vibration due to resonance, to save space, to eliminate dissipation of heat, and to improve the thermal efficiency of the gas turbine engine.

4 Claims, 2 Drawing Sheets

ENGINE CORE ROTOR SHAFT STRUCTURE FOR GAS TURBINE ENGINE

BACKGROUND OF THE INVENTION

1. Field of the Invention

The present invention relates to a rotor and, more particularly, to an engine core structure for use in the gas turbine engine of a centrifulgal type compressor.

2. Description of Related Art

FIG. 1 illustrates a conventional gas turbine engine 9 formed of a compression section 91, a combustion section 92, and a turbine section 93. The gas turbine engine 9 comprises a casing 94, an engine core rotor 95 installed in the casing 94, and an annular combustor 96 mounted in the annular space defined within the casing 94 around the core shaft 950 of the engine core rotor 95. The intake air is compressed and delivered (compressor rotor 941 and stator 951) to the combustor 96 at substantially increased pressure and temperature. There, the fuel is burned and the temperature raised to a higher value. Then, the hot, pressurized combustion gases expand through a series of rotating turbine wheel and blade assemblies (high pressure turbine 952, power turbine 971) resulting in shaft power output, propulsive thrust, or a combination of the two.

The diameter of the core shaft 950 is limited in the configuration of a conventional gas turbine. Due to limited diameter, it is difficult to improve the rigidity of the core shaft 950 and its vibrations. Vibration due to resonance is a serious problem which is more apparent in a high-speed micro gas turbine engine.

Further, because the annular combustor 96 is installed in the annular space within the casing 94 around the core shaft 950, the space occupation of the annular combustor 96 does not meet the requirement for compact design. Furthermore, the arrangement of the annular combustor 96 around the core shaft 950 may cause heat dissipation.

Therefore, it is desirable to provide an engine core rotor for gas turbine engine that eliminates the aforesaid drawbacks.

SUMMARY OF THE INVENTION

It is the main object of the present invention to provide an engine core structure for a gas turbine engine, which greatly enlarges the diameter of the shaft to increase its rigidity and avoid vibration due to resonance of the shaft, so as to further improve the stability and service life of the engine core. It is another object of the present invention to provide an engine core structure for a gas turbine engine, which keeps the combustor arranged inside the shaft to meet compact design requirements, so as to reduce heat dissipation and improve the thermal efficiency of the gas turbine engine.

To achieve these and other objects of the present invention, the engine core rotor shaft structure for a gas turbine engine comprises an outer annular shaft body, a gas turbine rotor body and high-pressure turbine (HPT) rotor blades. The outer annular shaft body is a hollow annular shape that extends in an axial direction and that comprises a front section, a rear section, and a middle section connected between the front section and the rear section and defining a receiving chamber. The outer diameter of the gas turbine rotor body is smaller than the inner diameter of the rear section of the outer annular shaft body. The HPT rotor blades are radially extended outwardly from the gas turbine rotor body and fixedly connected to the rear section of the outer annular shaft body. The gas turbine rotor body is coaxially provided in the rear section of the outer annular shaft body. Because the diameter of the outer annular shaft body is greatly increased, the rigidity of the shaft of the gas engine rotor is improved, and the critical speed of the shaft is increased, and therefore the stability of the rotation of the shaft is improved and the service life of the shaft is prolonged. A can type combustor is mounted in a receiving chamber inside the outer annular shaft body to save space, to eliminate dissipation of heat, and to improve the thermal efficiency of the gas turbine engine. A front annular shaft body of relatively smaller diameter may be provided inside the front section of the outer annular shaft body. High-pressure compressor (HPC) rotor blades are radially extended outwardly from the periphery of the front annular shaft body and fixedly connected to tie front section of the outer annular shaft body. The front annular shaft body is coaxially mounted inside the front section of tile outer annular shaft body.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
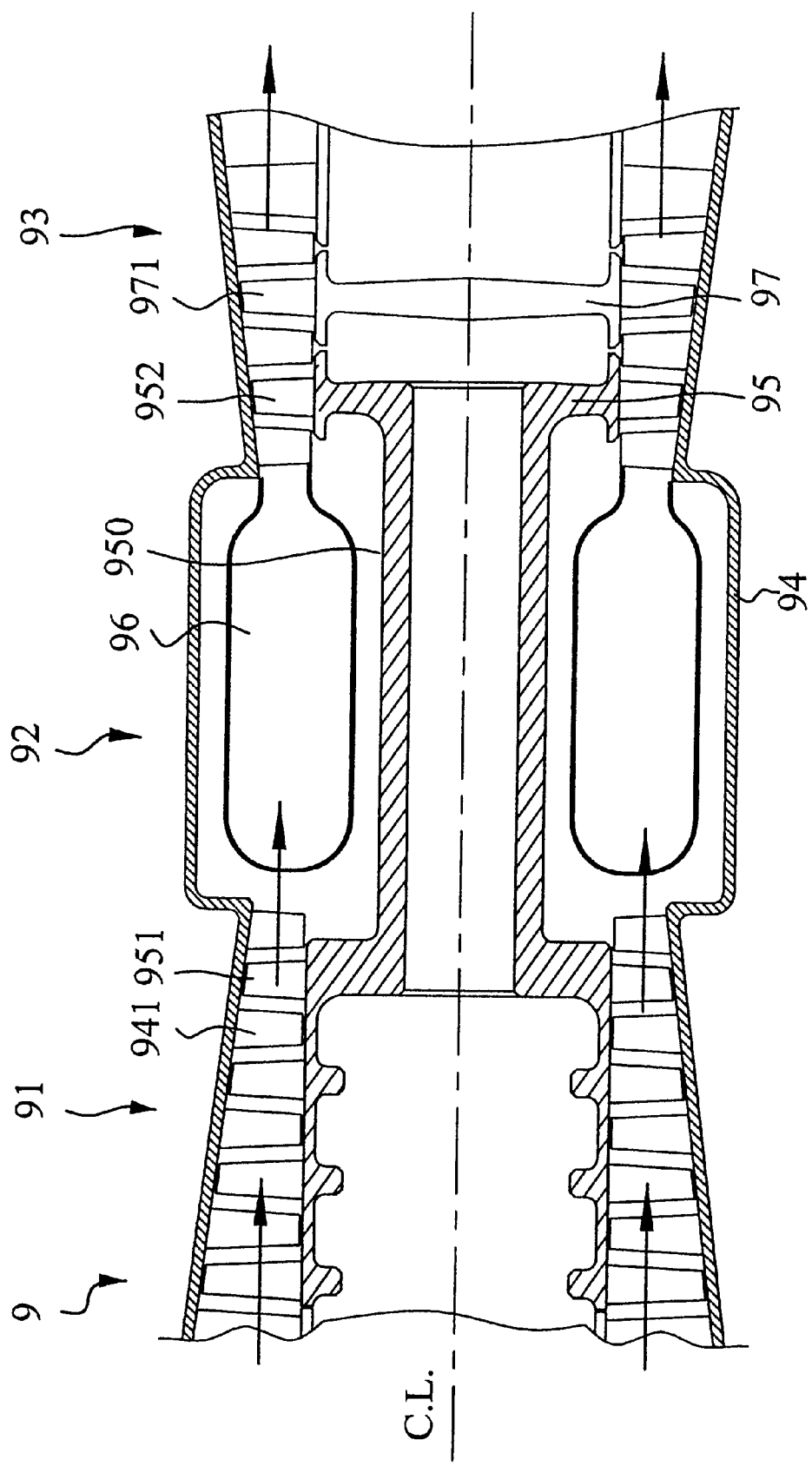
FIG. 1 is a schematic drawing showing an axial type gas turbine engine constructed according to the prior art.
Figure 2:
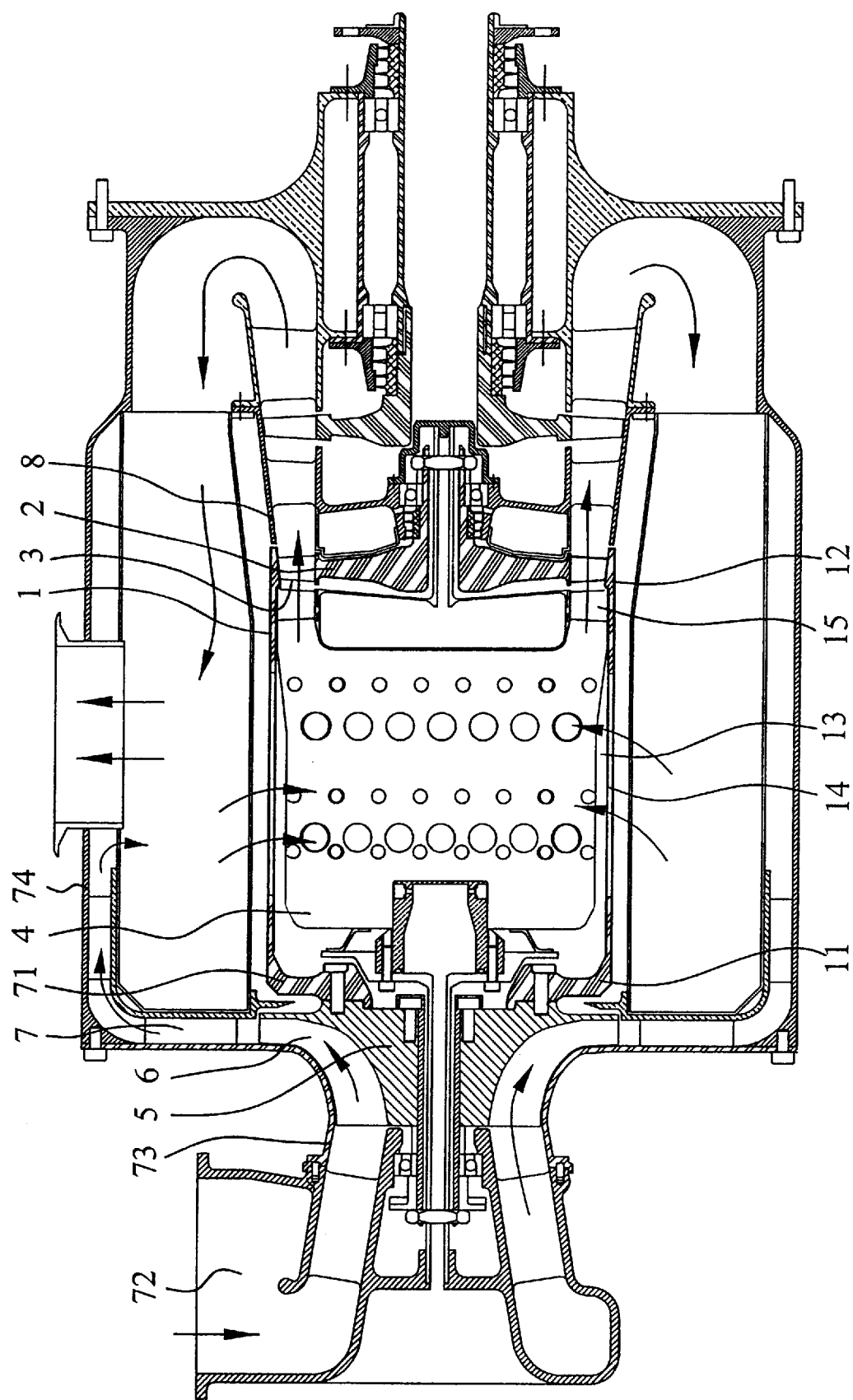
FIG. 2 is a detailed schematic drawing showing a gas turbine engine core structure constructed according to the present invention.

Referring to FIG. 2, the axial type gas turbine engine shown in the drawing is a micro gas turbine engine (thrust force below 200 pounds, or shaft power output 250 horsepower) whose rotary speed is usually beyond 60,000 rpm. As illustrated, the engine core rotor 71 is mounted inside a casing 74, which has a compression section 73 with a centrifugal impeller 5 at the front side, a combustion section 4 in the middle, and a turbine section 8 at the rear side.

The engine includes an engine core rotor 71, which comprises an outer annular shaft body 1, turbine rotor body 2, a plurality of turbine rotor blades 3, a centrifugal impeller 5, a plurality of impeller blades 6, and a combustor 4.

The outer annular shaft body 1 is a hollow annular shape extended in axial direction and comprises a front section 11, a rear section 12, and a middle section defining a receiving chamber 13. The combustor 4 is mounted in the receiving chamber 13. The combustor 4 is a can type combustor.

The turbine rotor body 2 is coaxially mounted in the rear section 12 of the outer annular shaft body 1. The outer diameter of the turbine rotor body 2 is smaller than the inner diameter of the rear section 12 of the outer annular shaft body 1. The turbine rotor blades 3 are radially extended from the periphery of the turbine rotor body 2 and fixedly connected to the inside wall of the rear section 12 of the outer annular shaft body 1.

The centrifugal impeller 5 is coaxially mounted to section 11 of the outer annular shaft body 1.

When intake air passes from the front side of the casing 72 into the compression section 73, impeller rotor blades 6 work to compress intake air, and the compressed air is then diffused by diffuser 7, and passed radially through the slots 14 before being combusted in the can type combustor 4. High pressure, high temperature gas flows out of the can type combustor 4 and is then guided by turbine guide vanes 15 of rotor blades 3, thereby causing the engine core rotor 71 and the centrifugal impeller 5 to rotate.

As indicated above, the diameter of the outer annular shaft body 1 is greatly enlarged, and the centrifugal impeller 5 and the turbine rotor body 2 are respectively provided in the front and rear sides of the outer annular shaft body 1. Therefore, the outer annular shaft body 1 can be designed to work under a high critical speed to improve the stability of the system and prolong its service life.

Because the diameter of the outer annular shaft body 1 is greatly increased, the combustor 4 can be directly mounted inside the outer annular shaft body 1 to meet the requirement for compact design. In comparison with conventional designs of equal output power, the greatly reduces the dimensions and weight of the engine core rotor. According to experiments, the dimensions and weight of the invention can be about 80% of a conventional gas turbine engine, or 20% of a conventional gasoline reciprocating engine.

Further, because the combustor 4 is provided inside the outer annular shaft body 1 and the casing 74, the design of the present invention effectively eliminates the problem of heat dissipation, and greatly improves the thermal efficiency of the gas turbine engine. In addition as illustrated in FIG. 2, a recuperator 8 may be installed between the casing 74 and the engine core rotor 71 to further increase the thermal efficiency of the system.

Although the present invention has been explained in relation to its preferred embodiments, it is to be understood that many other possible modifications and variations can be made without departing from the spirit and scope of the invention as hereinafter claimed.

What is claimed is:

1. A gas turbine engine core structure, comprising:
    an axially extended outer annular shaft body, said outer annular shaft body comprising a front section, a rear section, and a receiving chamber defined in a middle section connected between said front section and said rear section;
    a turbine rotor body, said turbine rotor body having an outer diameter smaller than an inner diameter of the rear section of said outer annular shaft body; and
    a plurality of turbine rotor blades respectively radially extended outwardly from turbine rotor body and fixedly connected to the rear section of said outer annular shaft body, wherein said turbine rotor body is coaxially provided in the real section of said outer annular shaft body, and said middle section of the outer annular shaft body includes slots through which compressed intake air passes in a radially inward direction to said receiving chamber and said rotor blades.

2. The gas turbine engine core structure as claimed in claim 1 further comprising a can type combustor mounted in the receiving chamber of said outer annular shaft body.

3. The gas turbine engine core structure as claimed in claim 1 further comprising a recuperator.

4. The gas turbine engine core structure as claimed in claim 1 further comprising:
    a centrifugal impeller body, said centrifugal impeller body being mounted to the front section of said outer annular shaft body.

* * * * *